US011995565B2

(12) United States Patent
Watson et al.

(10) Patent No.: US 11,995,565 B2
(45) Date of Patent: May 28, 2024

(54) ROAD ICING CONDITION PREDICTION FOR SHADED ROAD SEGMENTS

(71) Applicant: International Business Machines Corporation, Armonk, NY (US)

(72) Inventors: Campbell D. Watson, Brooklyn, NY (US); Mukul Tewari, Lafayette, CO (US); Eli Michael Dow, Wappingers Falls, NY (US); Levente Klein, Tuckahoe, NY (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 16/842,134

(22) Filed: Apr. 7, 2020

(65) Prior Publication Data

US 2021/0312306 A1    Oct. 7, 2021

(51) Int. Cl.
*G06N 5/04*     (2023.01)
*B60W 40/06*    (2012.01)
(Continued)

(52) U.S. Cl.
CPC .............. *G06N 5/04* (2013.01); *B60W 40/06* (2013.01); *G01W 1/10* (2013.01); *G06N 5/02* (2013.01);
(Continued)

(58) Field of Classification Search
None
See application file for complete search history.

(56) References Cited

U.S. PATENT DOCUMENTS 6,493,633 B2 * 12/2002 Baron, Sr. .............. G06Q 30/02
702/3
7,089,115 B2 * 8/2006 Chapman ................ G01W 1/00
702/3
(Continued)

FOREIGN PATENT DOCUMENTS

AU    2021251818 B2 *  1/2024  ............ B60W 40/06
CN     110334318 A  * 10/2019  ............ G06F 30/20
(Continued)

OTHER PUBLICATIONS

Shao, J., Lister, P.J. The prediction of road surface state and simulation of the shading effect. Boundary-Layer Meteorol 73, 411-419 (1995). https://doi.org/10.1007/BF00712680 (Year: 1995).*
(Continued)

*Primary Examiner* — Akash Saxena
(74) *Attorney, Agent, or Firm* — Patterson + Sheridan, LLP

(57) ABSTRACT

Road condition prediction for potentially hazardous road segments is described. For roadways that may contain accumulated frozen precipitation, a road segment for road condition prediction is selected based on weather conditions. Various models including a solar radiation budget model, a permanent structures model, a dynamic structures model, and a road condition model are generated for the selected road segment and account for shading effects on the road segment caused by objects near the road segment. A road condition prediction for hazardous conditions on the road segment is determined based on the road condition model and provided to a driver to alert the driver of any potentially hazardous conditions.

20 Claims, 6 Drawing Sheets

(51) Int. Cl.
  *G01S 17/42*   (2006.01)
  *G01W 1/10*   (2006.01)
  *G06N 5/02*   (2023.01)
  *G06Q 50/26*   (2024.01)
(52) U.S. Cl.
  CPC ............ *G06Q 50/265* (2013.01); *G01S 17/42* (2013.01); *G01W 2203/00* (2013.01)

(56) References Cited

U.S. PATENT DOCUMENTS

| | | | |
|---|---|---|---|
| 7,830,373 B1 * | 11/2010 | Gao | G06F 30/13 345/419 |
| RE42,439 E * | 6/2011 | Fulton | G01W 1/12 702/155 |
| 8,332,084 B1 | 12/2012 | Bailey et al. | |
| 8,645,067 B2 * | 2/2014 | Gallagher | G01W 1/00 340/602 |
| 8,680,994 B2 | 3/2014 | Leppanen et al. | |
| 9,087,338 B2 * | 7/2015 | Levine | G06F 17/10 |
| 9,098,654 B2 * | 8/2015 | Mewes | G06F 30/20 |
| 9,262,559 B2 * | 2/2016 | Mewes | G06F 30/20 |
| 9,447,899 B2 | 10/2016 | Li et al. | |
| 9,704,042 B2 | 7/2017 | Wu et al. | |
| 9,875,576 B2 * | 1/2018 | Bergman | G06T 11/206 |
| 10,319,229 B1 * | 6/2019 | Dow | G08G 1/096775 |
| 2005/0240378 A1 * | 10/2005 | Smith | H04W 4/024 702/188 |
| 2007/0265780 A1 * | 11/2007 | Kesler | G01K 7/42 374/E7.042 |
| 2010/0114714 A1 | 5/2010 | Vitek | |
| 2010/0250482 A1 * | 9/2010 | Ma | G06Q 10/06 706/54 |
| 2011/0043377 A1 * | 2/2011 | McGrath | G08G 1/096775 340/905 |
| 2013/0046470 A1 * | 2/2013 | Jee | H02J 3/004 702/3 |
| 2013/0116972 A1 * | 5/2013 | Hanatsuka | G01B 17/08 702/167 |
| 2013/0226537 A1 * | 8/2013 | Jee | G06F 17/10 703/2 |
| 2013/0346043 A1 * | 12/2013 | Mewes | G06F 30/20 703/2 |
| 2014/0039850 A1 * | 2/2014 | Jee | G06F 30/20 703/2 |
| 2014/0122045 A1 * | 5/2014 | Mewes | G06F 30/20 703/6 |
| 2015/0198452 A1 * | 7/2015 | Gupta | G01C 21/3691 701/533 |
| 2016/0048925 A1 | 2/2016 | Emison et al. | |
| 2018/0098137 A1 | 4/2018 | Saha et al. | |
| 2018/0304899 A1 * | 10/2018 | Cheng | B60W 40/06 |
| 2019/0362216 A1 * | 11/2019 | Stokes | G06F 3/016 |
| 2020/0293773 A1 * | 9/2020 | Loveland | G06V 20/188 |
| 2021/0312306 A1 * | 10/2021 | Watson | G01W 1/10 |

FOREIGN PATENT DOCUMENTS

| | | | | |
|---|---|---|---|---|
| CN | 110334318 A | | 10/2019 | |
| EP | 1412777 B1 | | 8/2006 | |
| JP | H09114371 A | | 5/1997 | |
| JP | H10282250 A | | 10/1998 | |
| KR | 101041022 B1 | | 4/2004 | |
| KR | 10-20130123181 A | | 11/2013 | |
| KR | 101280361 A | | 12/2013 | |
| KR | 101804928 B1 | | 12/2017 | |
| KR | 20220146516 A | * | 11/2022 | ........... G06Q 50/265 |
| WO | 2014147041 A1 | | 9/2014 | |

OTHER PUBLICATIONS

Kidd, C., Chapman, L. Derivation of Sky-View Factors from LIDAR Data, Report/Paper No. GSFC-E-DAA-TN9044, 17 Pages, Jan. 1, 2013 (Year: 2013).*

Rosskopf E, Morhart C, Nahm M. Modelling Shadow Using 3D Tree Models in High Spatial and Temporal Resolution. Remote Sensing. 2017; 9(7):719. https://doi.org/10.3390/rs9070719; 10 Pages (Year: 2017).*

PCT Notification of Transmittal of the International Search Report and the Written Opinion of the International Searching Authority, or the Declaration for Application No. PCT/CN2021/083227 dated Jun. 29, 2021.

Brown, Michael & Grimmond, Christine & Ratti, C. (2001). Comparison of methodologies for computing sky view factor in urban environments. International Society of Environmental Hydraulics Conference, Tempe, AZ.

Ariane Middel, Jonas Lukasczyk, Ross Maciejewski, Mattias Demuzere, Mattias Roth, "Sky View Factor Footprints for Urban Client Modeling," Urban Climate 25 (2018) 120-134.

Shao, J., Lister, P.J. The prediction of road surface state and simulation of the shading effect. Boundary-Layer Meteorol 73, 411-419 (1995). https://doi.org/10.1007/BF00712680.

U.S. Appl. No. 16/266,951, "Automated Management of Potentially Hazardous Objects Near Power Lines,", filed Feb. 4, 2019.

Qayyum et al., "Power lines vegetation encroachment monitoring based on satellite stereo images using stereo matching," IEEE Int. Conf. on Smart Instrumentation, Measurement and Applications (ICSIMA), INSPEC, 2014, pp. 5.

Australian Government, Examination Report No. 1 for Australian Application No. 2021251818 dated Mar. 20, 2023.

Australian Patent Office, Notice of Acceptance for Australian Patent Application No. 2021251818, dated Jan. 15, 2024.

* cited by examiner

ROAD ICING CONDITION PREDICTION FOR SHADED ROAD SEGMENTS

BACKGROUND

The present invention relates to predicting road conditions in adverse weather conditions, such as predicting the presence of snow and ice on roadways, and more specifically, to predicting the condition of a road segment based on the effect of solar radiation and potential melting and evaporation of any accumulated precipitation.

Road surface conditions are often unpredictable, especially during winter months in temperate climates where rapid transitions between dry road surfaces, wet road surfaces, snow and ice-covered road surfaces and other conditions can be common. Furthermore, while ambient temperatures surrounding the road segment may be above freezing, accumulated frozen precipitation may not melt and dry from the roadway. For example, shaded areas may remain cooler and prevent solar radiation from aiding in melting and drying the roadway. These various factors create conditions on roadways where a driver may unexpectedly transition from a clear and dry roadway to a roadway covered in snow or ice with no warning or indication that the roadway may be dangerous, which can cause loss of control of the vehicle. Accurately predicting road conditions and warning vehicle operators of the conditions can greatly increase the safety and efficiency of use of the roadway.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions of a method. One general aspect includes a method for road condition prediction. The method includes selecting a road segment for road condition prediction based on weather conditions and generating a solar radiation budget model for the road segment. The method also includes updating the solar radiation budget model for the road segment using a permanent structures model based on static objects near the road segment. The method also includes updating the solar radiation budget model for the road segment using a dynamic structures model based on dynamic objects near the road segment. The method also includes generating a road condition model for the road segment using the updated solar radiation budget model and weather variables. The method also includes outputting a road condition prediction for the road segment based on the road condition model. Other embodiments of this aspect include corresponding computer systems, apparatus, and computer programs recorded on one or more computer storage devices, each configured to perform the actions of the methods.

Implementations may include one or more of the following features. The method where selecting the road segment may include: determining, from a weather data source, present weather conditions for a geographic area indicate ice is possible on roadways within the geographic area; identifying one or more road segments of concern within the geographic area; and selecting the road segment from the one or more road segments of concern for road condition prediction.

According to another embodiment of the present disclosure, generating the solar radiation budget model for the road segment may include: determining a time period for analysis for the road segment; determining a geographic position of the road segment; and calculating an expected solar radiation budget for the road segment based on a solar position during the time period for analysis, the geographic position of the road segment, and weather conditions associated with the road segment during the time period for analysis.

According to another embodiment of the present disclosure, updating the solar radiation budget model for the road segment using the permanent structures model may include: determining a permanent sky view factor for the road segment using LIDAR data points and/or a satellite snapshot of that region, and updating the expected solar radiation budget based on the permanent sky view factor the solar position during the time period for analysis and the weather conditions associated with the road segment during the time period for analysis.

According to another embodiment of the present disclosure, updating the solar radiation budget model for the road segment using the dynamic structures model may include: determining a vegetation model factor for the road segment; updating the vegetation model factor based on growth prediction for vegetation associated with the road segment; updating the expected solar radiation budget based on the updated vegetation model factor the solar position during the time period for analysis and the weather conditions associated with the road segment during the time period for analysis.

According to another embodiment of the present disclosure, generating the road condition model for the road segment using the updated solar radiation budget model and the weather variables may include: generating an expected ice accumulation for the road segment based on the weather variables; simulating an expected ice reduction for the road segment based on the weather variables, one or more road treatment factors, and the updated solar radiation budget model; and determining from the expected ice accumulation and the expected ice reduction the road condition prediction.

According to another embodiment of the present disclosure, when the road condition prediction indicates that ice is present on the road segment, outputting the road condition prediction for the road segment may include: generating an ice travel advisory for the road segment; and providing the ice travel advisory to a public warning system.

According to a different embodiment of the present disclosure, any combination of the above-discussed embodiments can be implemented by one or more computer-readable storage media. The computer-readable storage media collectively contain computer program code that, when executed by operation of one or more computer processors, performs an operation. In embodiments, the operation performed can correspond to any combination of the above methods and embodiments.

According to yet another different embodiment of the present disclosure, any combination of the above-discussed embodiments can be implemented by a system. The system includes one or more computer processors, and one or more memories collectively containing a program which, when executed by the one or more computer processors, performs an operation. In embodiments, the operation performed can correspond to any combination of the above methods and embodiments.

DETAILED DESCRIPTION

Figure 1:
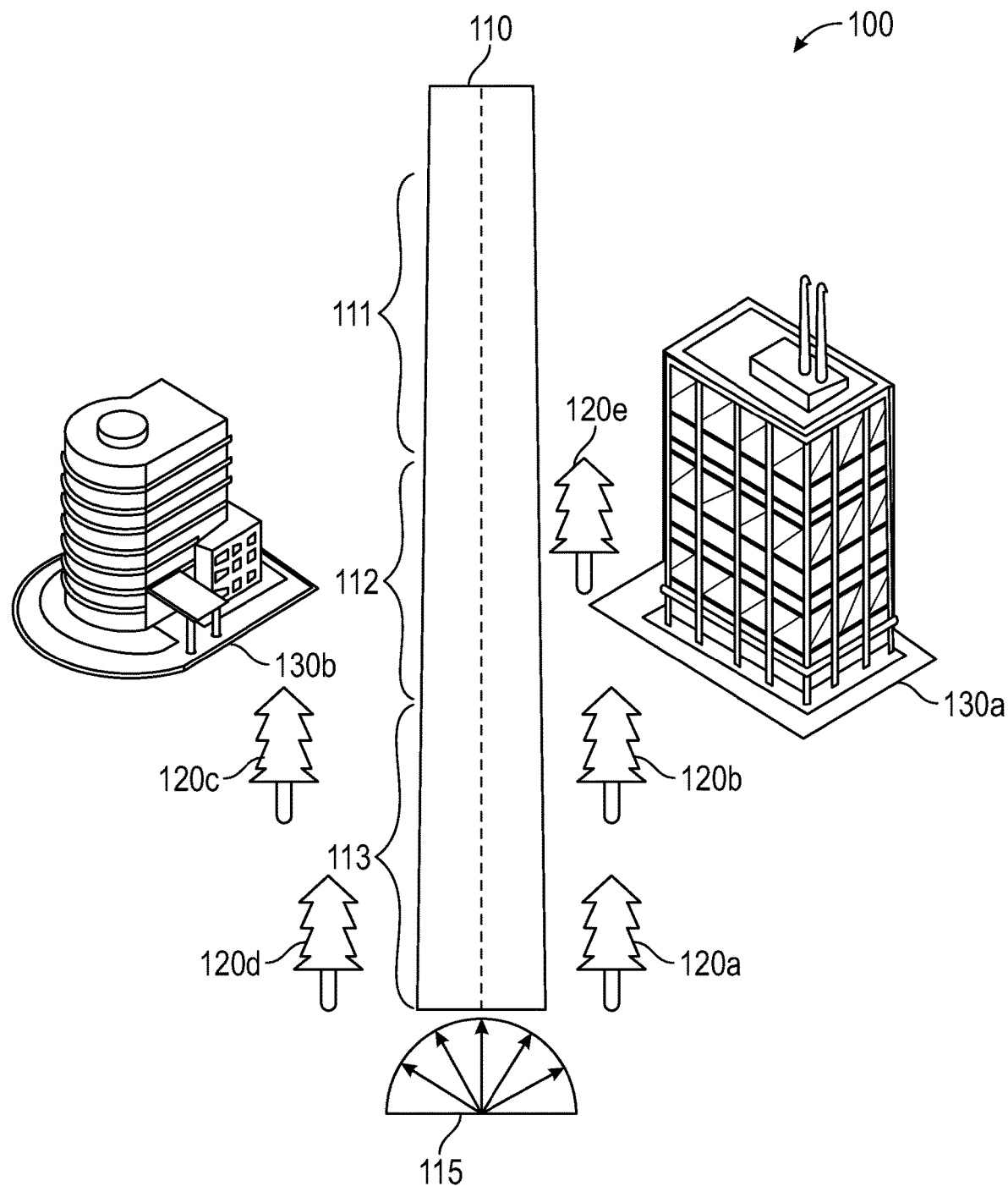
FIG. 1 is an example roadway with road segments, according to one embodiment.

During inclement weather, vehicle operators and drivers are aware that road surface conditions are dangerous and are not usually surprised by a road surface having snow and ice accumulation on the road surface. However, after the inclement weather has passed, road surface conditions can remain hazardous in certain sections. For example, shaded areas, low lying areas, and areas with poor drainage can remain covered in accumulated precipitation and/or remain hazardous long after other parts of the roadway are clear of precipitations or hazards. A vehicle operator unexpectedly encountering these hazardous conditions can result in loss of control of the vehicle among other undesirable outcomes.

Currently there are numerous methods that attempt to model and predict road surface conditions. For example, numerical models are often used to predict road surface conditions. The Fast All-season Soil Strength Model (FASST) model, from the US Army Corps of Engineers, provides information such as predicted ground moisture levels, ground level ice content, temperature, freeze/thaw profiles, and snow accumulation/depletion and can be used to provide a general road surface condition prediction for a large region using basic or standard inputs. Likewise, other physics based models such as the Noah-Multiparameterization Land Surface Model (Noah-MP LSM), which uses information related to vegetation and vegetation canopies, can also provide an estimated road surface conditions based on general or non-specific inputs.

Some models utilize a calculated sky view factor (Tsky) as an input in radiation balance schemes for the partitioning of longwave and shortwave radiation within urban and forest canopies as well as complex terrain which can improve the prediction models. Currently, there are many factors and methods that are used to compute Tsky. Some methods utilize light detection and Ranging (LIDAR) models to determine shadowing and other factors that are used in Tsky calculations. However, due to resource limitations LIDAR scans and models are rarely updated and therefore cannot be reliably used to predict shading from non-permanent shading sources such as dynamic vegetation (e.g., vegetation with seasonal foliage, changing growth patterns, etc.). These non-permanent shading sources can be a primary source of road shading for some roadways, such as roadways in rural areas. Overall, the above described models do not utilize granular and real-time shading information or modeling that may affect certain segments of the roadway. This can leave vehicle operators vulnerable to encountering hazardous conditions with no warning.

While shading information and the shading effect on roadways have been considered in previous road condition prediction models, the models are deficient with concern to granular accuracy and at scale where and when a road segment is shaded. This is due in part to the large number of variables that goes into determining if a particular segment of the road is shaded and using that information to predict if the road remains hazardous. Further, while shading information may be used it cannot be accurately used for specific road segments. This can lead to false positive notifications where a driver is alerted to hazardous conditions, but does not experience hazardous conditions on the majority of a roadway. This can cause a vehicle operator to ignore a hazardous condition alert but then encounter hazardous conditions.

In light of these concerns, accurate input data is required to accurately predict road surface condition. Local weather conditions (including solar radiation) and road surface type drives the various prediction models. In the case of an icy road, direct sunlight during the day can warm the road surface and melt ice. In some examples, thermal properties of the construction material used for roads may be used to estimate the temperature of the road under dynamic weather conditions. The road surface temperature is a balance between the heat that is absorbed from the atmosphere (including solar radiation) and heat that is lost to the ground (that may be cooler). However, as described above, if trees, buildings or other structures in close proximity to the road are blocking direct sunlight then the ice may remain.

Road shading also depends on angle of the sun (which changes throughout the day and year) and the position and shape of nearby structures (e.g., trees and buildings). Additionally, roadway foundation soil composition and infrastructure design (e.g., bridges and suspended roads) can also influence the melting and clearing of accumulated frozen precipitation on roadways, (e.g., bridges may become icy before other road segments and stay icy longer). Using the above models and methods, predicting an angle of the sun at a given time is straightforward, and predicting how a structure with known dimensions will shade a segment of road is also straightforward. However, the above models and methods all fail to obtain or model reliable and geographically widespread data and models detailing position of structures and other sources of shade that shade the roadways with granular accuracy.

The systems and methods described herein provide for granular modeling of a roadway and road segments of the roadway to accurately model and predict a level of accumulated dangerous precipitation on a roadway in a road condition prediction. This process includes selecting a road segment from a roadway for road condition prediction based on weather conditions, generating a solar radiation budget model for the road segment, updating the solar radiation budget model for the road segment using a permanent structures model based on static objects near the road segment, updating the solar radiation budget model for the road segment using a dynamic structures model based on dynamic objects near the road segment, and generating a road condition model for the road segment using the updated solar radiation budget model and weather variables among other various methods and factors as described in relation to FIGS. 1-7.

FIG. 1 is an example roadway with road segments, according to one embodiment.

An environment 100 in FIG. 1 includes a roadway 110 which includes various sub-segments of the roadway include road segments 111-113. The roadway 110 also has an associated Tsky 115 which can be used in calculating an expected solar radiation budget for the roadway 110. Furthermore, in some examples, each road segment 111-113 also has an associated unique Tsky based on a position of the road segment and various surrounding objects/structures in the environment 100.

For example, for the road segment 113 various dynamic structures and dynamic objects can cause dynamic or changing shading patterns based on a plurality of factors. For example, dynamic objects such as vegetation including trees 120a-120e can cause the road segment 113 to experience different levels of shading during different times of the year and according to different levels of shade causing vegetation present. For example, a tree with varying foliage at different times of the year will cause different levels of shade according to the foliage. Additionally, the trees 120a-120 may also grow in size causing more shade to be cast on the road segment 113 as the vegetation grows. In another scenario, the vegetation may be trimmed, periodically and the total shading area is reduced. While shown as the trees 120a-120d and 120e in FIG. 1, dynamic shading can be caused by a variety of vegetation in addition or instead of trees. For example, bushes, vines, crops, and other types of shade causing vegetation may be located near the roadway 110 and cause shade over the roadway.

In some examples, segments of the roadway 110 may also experience shade from more permanent structures in the environment 100. For example, the permanent structures or objects may include buildings 130a and 130b which may shade portions of the roadway 110. While shown as buildings 130a and 130b, the permanent structures may also include other static or unchanging objects that may cast shade over the roadway 110 such as retaining or sound proofing walls, bridges, billboard signs, etc. Further, while shown as a single roadway, the roadway 110 may be a road segment of a larger road network such as described in relation to FIG. 2.

Figure 2:
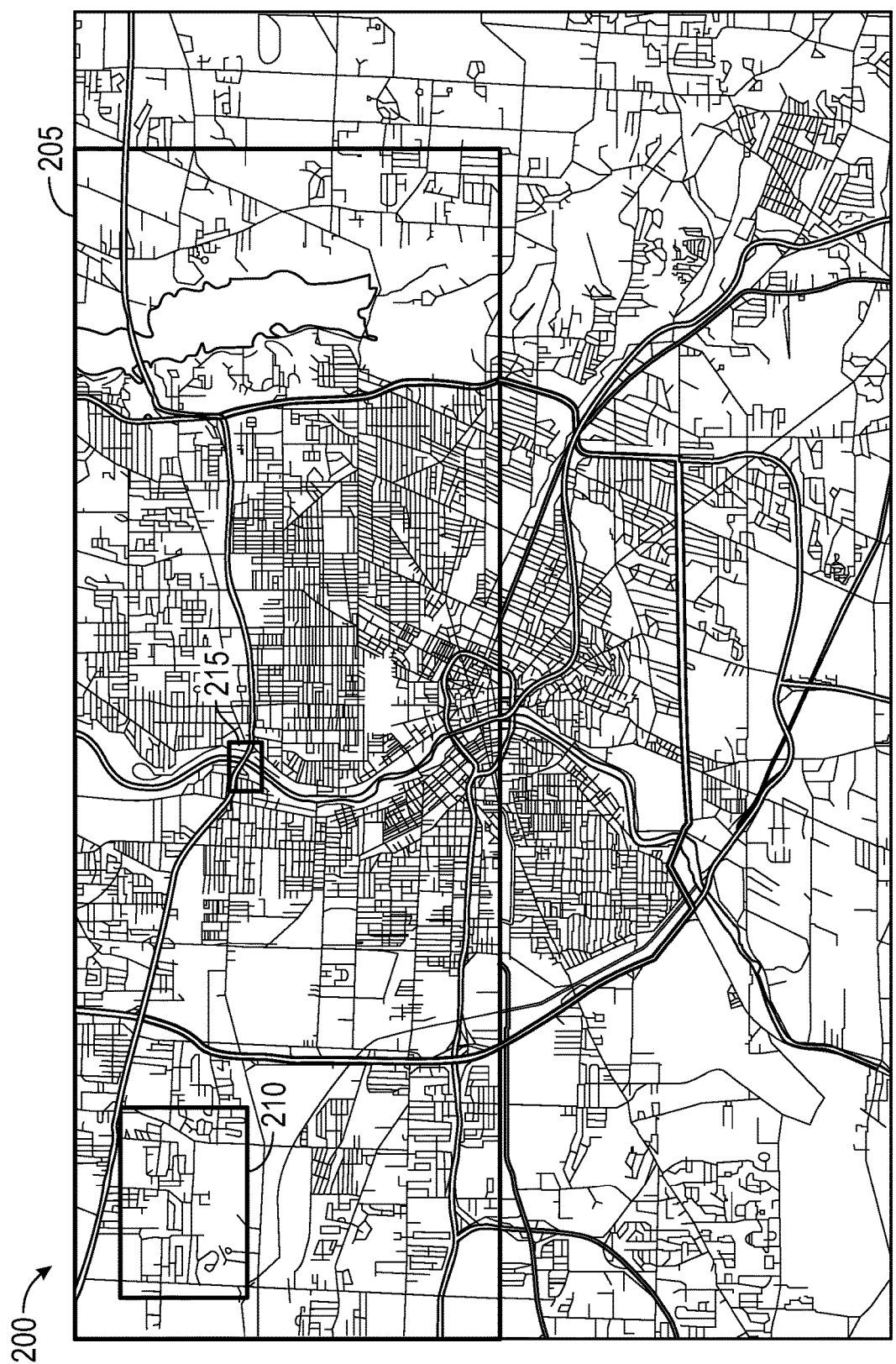
FIG. 2 is an example road system, according to one embodiment.

FIG. 2 is an example road system, according to one embodiment. The road system 200 includes a plurality of roadways and road segments. In some examples, the road system 200 includes all navigable and/or publicly maintained roads in a particular area of interest such as a city, county, metropolitan area, state, etc. As described above, general or broad based road condition models for the road system 200 may provide a broad understanding of the road conditions for the entire road system 200. However, the road conditions for more granular or targeted areas may be unknown.

For example, a geographic area 205 of the road system 200 may experience different weather conditions than the remaining sections of the road system 200. Furthermore various other subsections may be known for differing or irregular conditions from the rest of the road system 200 based on various factors such as weather conditions in specific geographic areas, vegetation within geographic areas, and road structure factors. For example, a geographic area 210 may be a residential area where the roadways and road segments are shaded primarily by vegetation. In another example, the road may pass through a densely vegetated area like park or forest where the local weather pattern may be different from less vegetated areas and the solar budget is totally controlled by vegetation state. In another example, a geographic area 215 may be associated with roadways that experience icing more frequently such as a bridge or elevated roadways. The methods and systems described in FIGS. 3-6 provide a more detailed and granular prediction for the various geographic areas and road segments in order to provide accurate road condition predictions.

Figure 3:
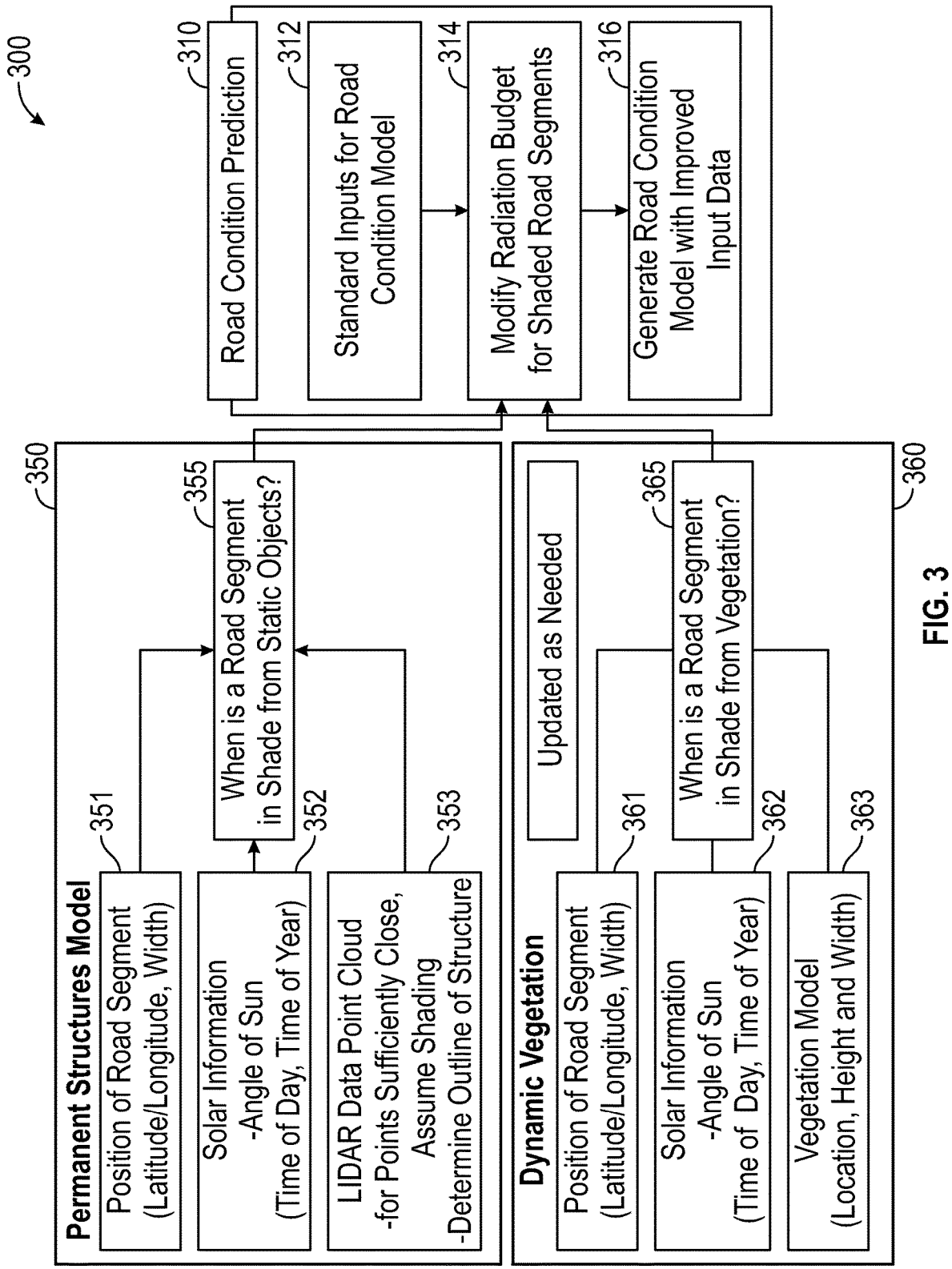
FIG. 3 is an example system process flow, according to one embodiment.

FIG. 3 is an example system process flow, according to one embodiment. System process 300 includes a general road condition model process 310, a permanent structures model 350, and a dynamic vegetation model 360. The road condition model process 310 is a high level view of a road condition model process. The road condition model process 310 begins at process step 312 where a road prediction system, such as road prediction system 700 described in FIG. 7, uses standard inputs for road condition to generate a road condition model for a particular road segment. The particular road segment may be selected according to the various factors described in relation to method 400 in FIG. 4. The standard inputs for the road condition model may include weather data, time data, sun position data, and various other information to generate a general road condition model which includes at least an accumulated precipitation and a solar radiation budget. In some examples, the road condition model generated at road condition model process 310 may be for an entire road system, such as the road system 200, and used to provide a general road condition prediction. Various road segments in the road system 200 may then be selected and further processed at process step 314 to provide granular information for areas and road segments that may be shaded.

At process step 314, the road prediction system 700 modifies a radiation budget for shaded road segments. In some examples, the radiation budget in the road condition model is modified using a permanent structures model 350 and a dynamic vegetation model 360. The permanent structures model 350 utilizes various information such as a position of a road segment, position 351 which may include the global position (e.g., latitude and longitude) as well as a size of the road segment (e.g., width of the road segment, etc.). The permanent structures model 350 also uses solar information 352 which may include a position of the sun in the sky (e.g., position based on angle of the sun at a certain day or time of year). The permanent structures model 350 also uses a structure models such as a LIDAR data point cloud or satellite/aerial imagery 353 to determine a shape of permanent structures/objects near the road segment and shading caused by the permanent structures or objects. The position 351, the solar information 352, and the LIDAR data point cloud 353 are inputs into a model decision 355 which determines when the road segment is shaded by permanent structures. When the road segment is shaded by permanent structures, the radiation budget is updated at the process step 314 to reflect the shade.

The dynamic vegetation model 360 model utilizes various information such as a position of a road segment 361 which may include the global position (e.g., latitude and longitude) as well as a size of the road segment (e.g., width of the road segment, etc.). The dynamic vegetation model 360 also uses solar information 362 which may include a position of the sun in the sky (e.g., angle of the sun at a certain day or time of year). The dynamic vegetation model 360 uses a vegetation growth model 363 to determine a location, height, and size of vegetation near the road and shading caused by the vegetation or other dynamic objects. In some examples, the model may utilize the type of tree species that is nearby the road that can have canopy size and leaf density that controls the solar budget that affect that local segment of road. The position 361, the solar information 362, and the vegetation growth model 363 are inputs into a model decision 365 which determines when the road segment is shaded by dynamic objects such as vegetation. When the road segment is shaded by vegetation, the radiation budget is updated at the process step 314 to reflect the shade caused by the dynamic sources. In some examples, the permanent structures model 350 may be reused over a long period of time without needing to be updated (e.g., a LIDAR data point cloud may use data that is stale since permanent structures are less likely to change). In contrast, the dynamic vegetation model 360 is updated as needed to reflect changing vegetation patterns over time (e.g., between seasons, expected biomass growth, etc.).

The road condition model process 310 continues at process step 316 where a road prediction system generates a road condition model for the road segment and/or a road system with the improved input data provided by the models 350 and 360. The road condition model process 310 is described in more detail in relation to FIGS. 4-7.

Figure 4:
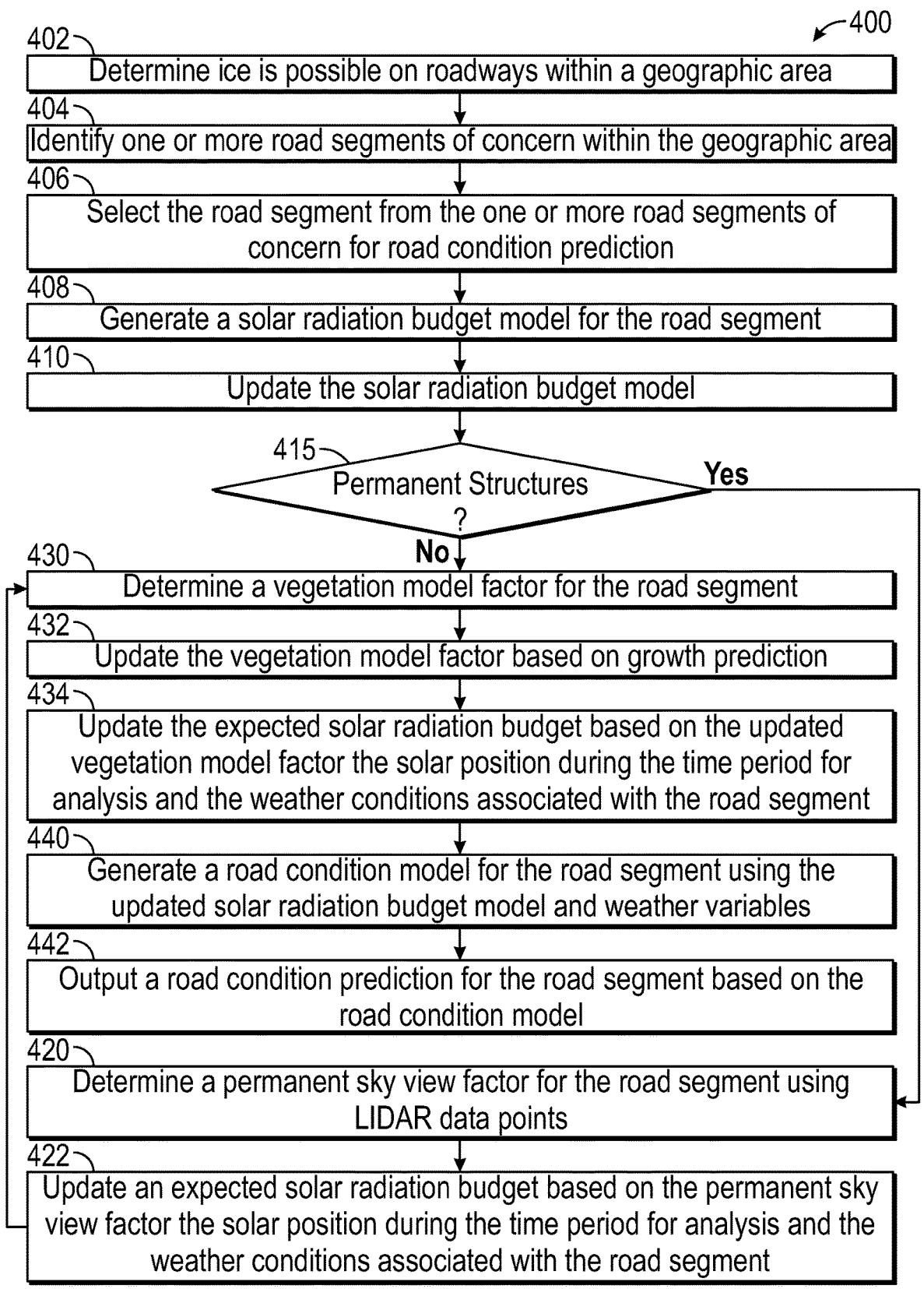
FIG. 4 is a method for road condition prediction, according to one embodiment.

FIG. 4 is a method for road condition prediction, according to one embodiment. For ease of discussion reference will be made to FIGS. 1-3 and 5-7. FIG. 7 is a block diagram of the road prediction system 700 which may perform the steps of the methods described in FIGS. 4-6. Method 400 begins at block 402, where the system 700 determines ice is possible on roadways within a geographic area. In some examples, this determination is based on weather conditions received from a weather data source (e.g., a national weather bureau or a commercial weather forecasting service). In some examples, the determination that ice is possible on roadways may occur for an entire road system such as road system 200 in FIG. 2. In another example, the determination is based on more targeted information such as weather data for a smaller geographic region. For example, the geographic area 205 may be experiencing a winter storm such that the smaller geographic area, geographic area 205 is subject to the determination that ice is possible on the roadways within the geographic area 205. The determination at block 402 may also be based on other information such as historical icing information (e.g., certain weather patterns have caused icing in the area in the past) and roadway factors (e.g., road construction results in expected icing). In some examples, the determination that ice is possible on roadways initiates the road condition model process 310.

At block 404, the system 700 identifies one or more road segments of concern within the geographic area. For example, system 700 may select all of the road segments within the geographic area if weather forecast indicates hazardous conditions are expected throughout the geographic area. In another example, a standard road condition model may be generated as discussed in process step 312. Road segments within the road condition model that may have unknown shading are then identified by system 700 for further processing. In another example, road segments that are known to be shaded (e.g., known to have permanent or dynamic objects close to the road segment) are identified for further processing.

At block 406, the system 700 selects a road segment from the one or more road segments of concern for road condition prediction. This selection allows for a granular inspection of each road segment to provide accurate and granular road condition predictions. For example, for the roadway 110 shown in FIG. 1, the road segments 111-113 are identified as road segments of concern, and the system 700 selects road segment 112 for road condition prediction. In some examples, once an updated road condition model is generated for the selected road segment, the system 700 returns to block 406 and selects another road segment of concern for further processing (e.g., selects road segments 111 and 113).

At block 408, the system 700 generates a solar radiation budget model for the road segment. For example, the system 700 generates a standard Tsky for the selected road segment. For example, the system 700 generates a Tsky for the road segment 112. In some examples, generating the solar radiation budget for the selected road segment includes the method described in FIG. 5.

Figure 5:
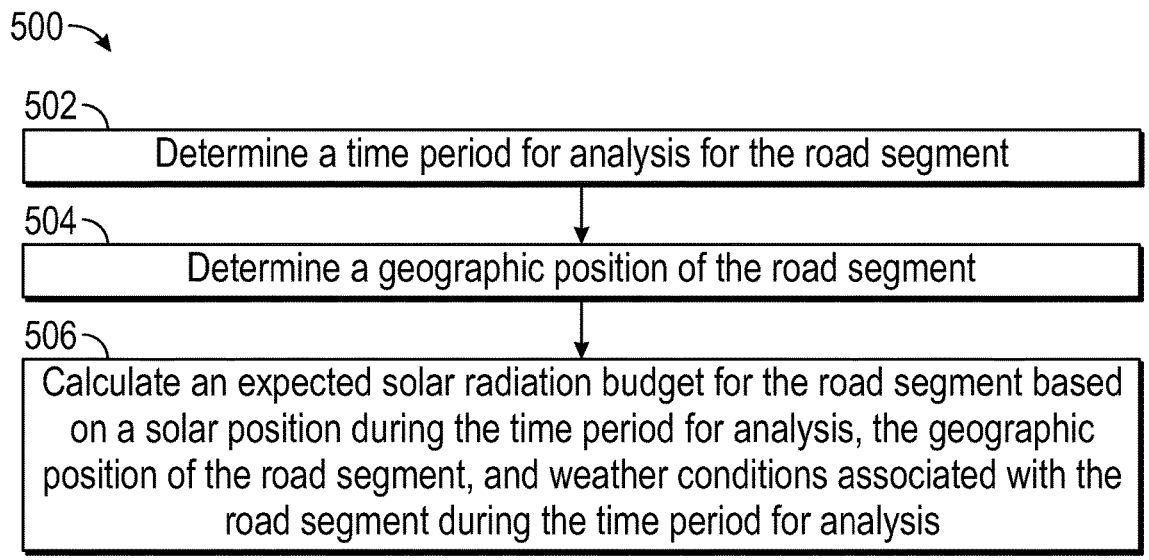
FIG. 5 is a method for determining a solar radiation budget, according to one embodiment.

FIG. 5 is a method for determining a solar radiation budget, according to one embodiment. Method 500 begins at block 502 where the system 700 determines a time period for analysis for the road segment. For example, the system 700 may select the last 24 hours for analysis or another time period based on weather conditions (e.g., presence of precipitation, cloud cover, etc.). At block 504, the system 700 determines a geographic position of the road segment. For example, the system determines a latitude and longitude of the selected road segment.

At block 506, the system 700 calculates an expected solar radiation budget for the road segment based on a solar position during the time period for analysis, the geographic position of the road segment, and weather conditions associated with the road segment during the time period for analysis. For example, the calculated solar radiation budget models the amount of sunlight that is expected to reach the road segment and provide melting to any accumulated frozen precipitation on the road surface. In some examples, the calculation of the solar radiation budget also uses thermal properties of the construction material used for roads to estimate the temperature of the road under dynamic weather conditions and solar radiation levels. Upon calculation of the solar radiation budget for the selected road segment at block 506, the process step 312 is complete for at least the selected road segment and a road condition model and simulation without accounting for shading can be generated. However, the model will not account for hazardous conditions in shaded areas of a road segment.

Returning back to FIG. 4, at block 410, the system 700 begins updating the solar radiation budget model based on shading of the roadway as shown at process step 314. At block 415, the system 700 determines whether permanent structures are causing shading on the road segment. For example, for the road segments 111 and 113, permanent structures are not detected based on LIDAR models and other roadway information. In this example, method 400 proceeds to block 430. In another example, such as for the road segment 112, the system 700 determines permanent structure(s) do cause shading on the road segment, such as the building 130a and 130b. In this example, method 400 proceeds to block 420 and begins utilizing the model 350 to modify the radiation budget for the process step 314.

At block 420, the system 700 determines a permanent sky view factor for the road segment using LIDAR data points. The permanent klisky is determined using the various inputs of the model 350 in order to alter the radiation budget based on the shade cast by the permanent structures over the road segment 112. At block 422, the system 700 updates the expected solar radiation budget based on the permanent sky view factor the solar position during the time period for analysis and the weather conditions associated with the road segment during the time period for analysis. For example, while the road segment 112 may be expected to experience a high level of solar radiation during a sunny day, the presence of the building 130a and 130b may prevent the solar radiation from reaching the road segment due to the shade cast by the building. The updated expected solar radiation budget accounting for the permanent structures will lower the amount of expected solar radiation to reflect the actual solar radiation experienced by the road segment. Once the permanent structures model 350 is used to update the solar radiation budget, the method 400 proceeds to using the dynamic vegetation model 360 to account for dynamic shading at blocks 430-434.

At block 430, the system 700 determines a vegetation model factor for the road segment. In some examples, the vegetation model is generated using LIDAR data points for the road and other information. The vegetation model may use various information from the LIDAR data points to determine vegetation isolation (e.g., tree isolation), vegetation type (e.g., tree species), canopy size, vegetation location, and other information to determine the location, position, and shade causing ability of the vegetation near the road segment. For example, the vegetation model 360 models the tree 120e as affecting the road segment 112 based on known or measured data (e.g., known location of tree 120e, etc.).

At block 432, the system 700 updates the vegetation model factor based on growth prediction for vegetation associated with the road segment. For example, the system 700 updates the vegetation model from block 430 to model vegetation growth using a vegetation management model based on biomass estimates from combined satellite and LIDAR data among other factors (e.g., long term climate conditions, etc.). The system 700 may use tree identification information, hyper localized growth prediction models, proximity to road segments, tree height estimation models, vegetation trimming models, and tree mortality detection models to predict changes to the biomass estimate.

At block 434, the system 700 updates the expected solar radiation budget based on the updated vegetation model factor, the solar position during the time period for analysis, and the weather conditions associated with the road segment during the time period for analysis. Once the solar radiation budget is updated to account for shading caused by structures and dynamic vegetation the method 400 proceeds to generate a road condition model with improved data in the process step 316. In some examples, every road segment of interest is processed through blocks 415-434 prior to proceeding to the road condition model.

At block 440 the system 700 generates a road condition model for the road segment using the updated solar radiation budget model and weather variables. At block 442, the system 700 outputs a road condition prediction for the road segment based on the road condition model. The methods in blocks 440 and 442 are discussed in more detail in relation to FIG. 6.

Figure 6:
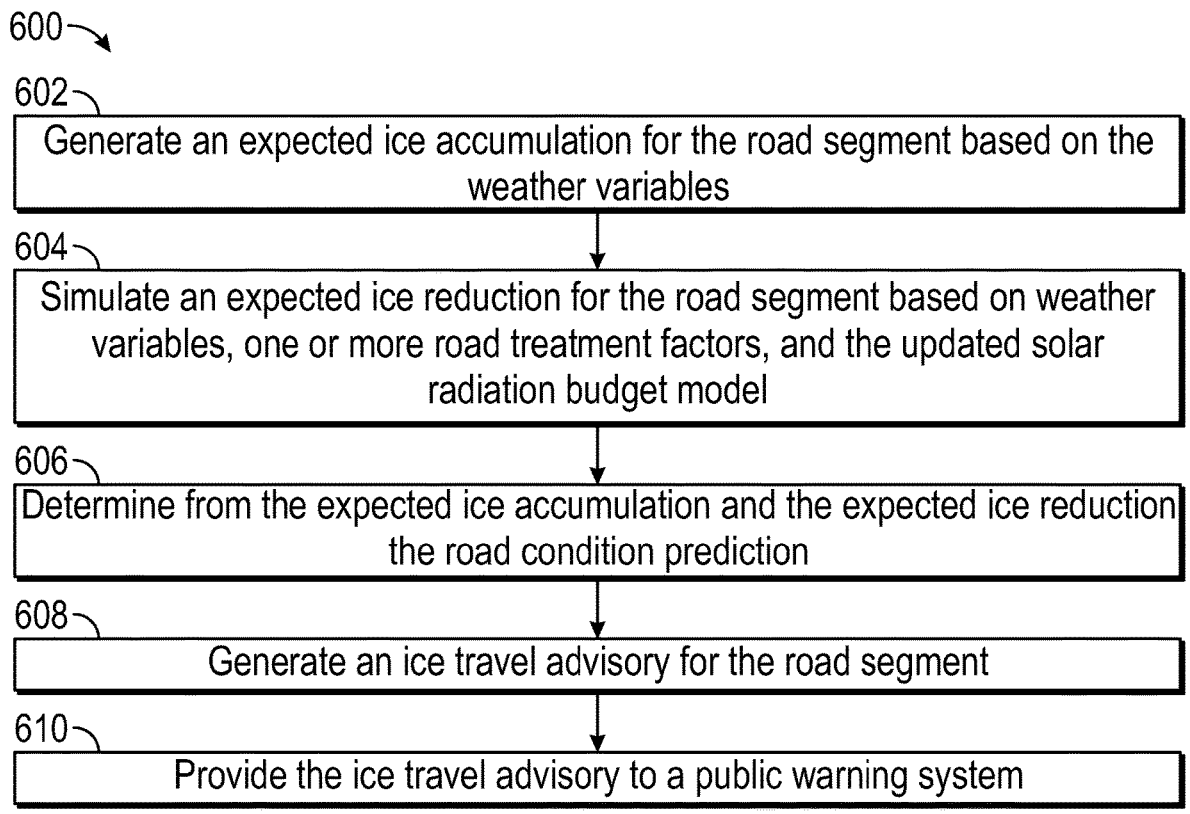
FIG. 6 is method for road condition modeling, according to one embodiment.
Figure 7:
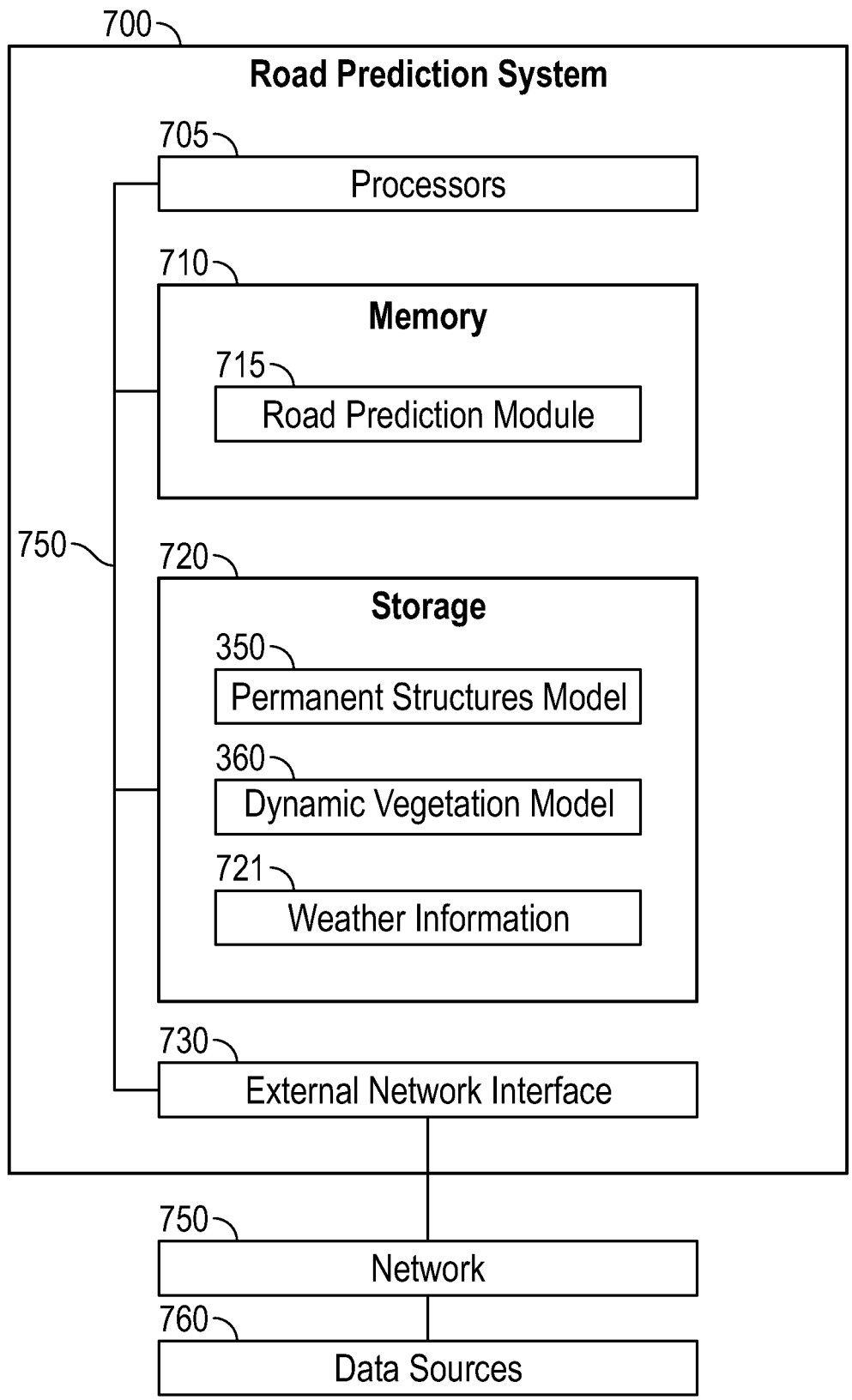
FIG. 7 illustrates a block diagram of a road prediction system, according to one embodiment.

FIG. 6 is method for road condition modeling, according to one embodiment. At block 602, the system 700 generates an expected ice accumulation for the road segment based on the weather variables. For example, the system 700 uses weather information over a period of time to determine an amount of snow, ice, or freezing rain expected to accumulate on the road surface of the road segment. At block 604, the system 700, simulates an expected ice reduction for the road segment based on the weather variables, one or more road treatment factors, and the updated solar radiation budget model. For example, the system 700 determines an amount of solar radiation expected to interact with the accumulated precipitation based on the weather (e.g., cloudiness, etc.). The system 700 also uses the solar radiation budget to determine an expected ice reduction as well as whether the road has been treated. For example, when a road surface of the road segment has salt, sand, or other treatment applied, the expected reduction will be greater than without a treatment.

At block 606, the system 700 determines from the expected ice accumulation and the expected ice reduction the road condition prediction. For examples, for the road segment 112, when the expected ice reduction is less than the expected ice accumulation the road condition prediction indicates that ice or hazardous conditions are present. In another example, the expected ice reduction may be greater than the expected ice accumulation indicating that the road segment is likely clear of ice or accumulated precipitation.

At block 608, the system 700 generates an ice travel advisory for the road segment indicating whether the road segment is hazardous (i.e., ice is present) or clear (i.e., ice is not expected on the road segment).

At block 610, the system 700 provides the ice travel advisory to a public warning system. For example, the system 700 provides the advisory to a public traffic prediction system, commercial traffic systems, and/or directly to drivers to allow for quick and updated information to drivers in an area around the modeled road segment. In some examples, the advisory is provided only to drivers or those expected to interact with a hazardous road segment. For example, as a driver travels down roadway 110 and is close to road segment 112, the driver will receive an alert that the road segment 112 is hazardous.

In another example, when an entire roadway or road system is evaluated, the hazardous areas or hazardous road segments may be highlighted in a mapping of the entire system and provided to a more general audience with an identification of the hazardous areas.

This advisory system with the enhanced prediction provided by the models 350 and 360 and the methods described in FIGS. 4-6 allows for drivers/vehicle operations to be better prepared when interacting with road segments that may be covered in accumulated precipitation which can decrease a number of road accidents which in turn reduces costs for insurance companies and individual drivers due to the drop in medical and property insurance claims, potential injuries to people, and damage to property among various other benefits.

FIG. 7 illustrates a block diagram of a road prediction system 700, according to one embodiment. The road prediction system 700 is shown in the form of a general-purpose computing device. The components of road prediction system 700 may include, but are not limited to, one or more processors or processing units 705, a system memory 710, a storage system 720, network interface 730, and a bus 750 that couples various system components including the system memory 710 and storage system 720 to processors 705 along with the network interface 730 and various input/output components. In other embodiments, road prediction system 700 is distributed and includes a plurality of discrete computing devices that are connected through wired or wireless networking.

Bus 750 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Road prediction system 700 typically includes a variety of computer system readable media. Such media may be any available media that is accessible by road prediction system 700, and it includes both volatile and non-volatile media, removable and non-removable media.

System memory 710 can include computer system readable media in the form of volatile memory, such as random access memory (RAM) and/or cache memory. Road prediction system 700 may further include other removable/non-removable, volatile/non-volatile computer system storage media. In some examples storage system 720 may be included as part of memory 710 and may typically provide a non-volatile memory for the networked computing devices, and may include one or more different storage elements such as Flash memory, a hard disk drive, a solid state drive, an optical storage device, and/or a magnetic storage device. For example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. Storage 720 may include media for storing permanent structures model 350, dynamic vegetation model 360, weather information 721, and other data related to the running of a road prediction module 715. The information stored in storage system 720 may be updated and accessed by road prediction module 715 as described above in relation to FIGS. 4-6.

Memory 710 may include a plurality of program modules such as the road prediction module 715 for performing various functions related to road condition prediction described herein. The road prediction module 715 generally include program code that is executable by one or more of the processors 705.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., road prediction module 715, the permanent structures model 350, and the dynamic vegetation model) or related data available in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for road condition prediction comprising:
   selecting a road segment for road condition prediction based on weather conditions;
   generating a solar radiation budget model for the road segment;
   determining a vegetation model factor for the road segment;
   updating the vegetation model factor, in a dynamic structures model for the road segment, based on growth prediction for the tree, wherein the growth prediction is based on biomass growth estimates for the tree and localized growth models for the tree based on long term climate conditions of the road segment;
   updating the solar radiation budget model using a permanent structures model and the dynamic structures model, wherein the permanent structures model is based on static objects near the road segment and the dynamic structures model is based on vegetation near the road segment where the vegetation growth model is used to determine a location, height and size of the vegetation near the road to determine a level the road segment is shaded by the vegetation;
   generating a road condition model for the road segment using the updated solar radiation budget model and weather variables to identify at least one of wet, snow covered, or ice covered road surfaces; and
   outputting a road condition prediction for the road segment based on the road condition model.

2. The method of claim 1, wherein selecting the road segment comprises:

determining, from a weather data source, present weather conditions for a geographic area indicate ice is possible on roadways within the geographic area;

identifying one or more road segments of concern within the geographic area; and selecting the road segment from the one or more road segments of concern for road condition prediction.

3. The method of claim 1, wherein generating the solar radiation budget model for the road segment comprises:

determining a time period for analysis for the road segment;

determining a geographic position of the road segment; and calculating an expected solar radiation budget for the road segment based on a solar position during the time period for analysis, the geographic position of the road segment, and weather conditions associated with the road segment during the time period for analysis.

4. The method of claim 3, wherein updating the solar radiation budget model for the road segment using the permanent structures model comprises:

determining a permanent sky view factor for the road segment using LIDAR data points, and updating the expected solar radiation budget based on the permanent sky view factor the solar position during the time period for analysis and the weather conditions associated with the road segment during the time period for analysis.

5. The method of claim 4, wherein updating the solar radiation budget model for the road segment using the dynamic structures model comprises:

updating the expected solar radiation budget based on the updated vegetation model factor the solar position during the time period for analysis and the weather conditions associated with the road segment during the time period for analysis.

6. The method of claim 1, wherein generating the road condition model for the road segment using the updated solar radiation budget model and the weather variables comprises:

generating an expected ice accumulation for the road segment based on the weather variables;

simulating an expected ice reduction for the road segment based on the weather variables, one or more road treatment factors, and the updated solar radiation budget model; and determining from the expected ice accumulation and the expected ice reduction the road condition prediction.

7. The method of claim 6, wherein when the road condition prediction indicates that ice is present on the road segment, outputting the road condition prediction for the road segment comprises:

generating an ice travel advisory for the road segment; and providing the ice travel advisory to a public warning system.

8. A system comprising:

one or more computer processors; and a memory containing a program which when executed by the one or more computer processors performs an operation comprising:

selecting a road segment for road condition prediction based on weather conditions;

generating a solar radiation budget model for the road segment;

determining a vegetation model factor for the road segment;

updating the vegetation model factor, in a dynamic structures model for the road segment, based on growth prediction for the tree, wherein the growth prediction is based on biomass growth estimates for the tree and localized growth models for the tree based on long term climate conditions of the road segment;

updating the solar radiation budget model using a permanent structures model and the dynamic structures model, wherein the permanent structures model is based on static objects near the road segment and the dynamic structures model is based on vegetation near the road segment where the vegetation growth model is used to determine a location, height and size of the vegetation near the road to determine a level the road segment is shaded by the vegetation;

generating a road condition model for the road segment using the updated solar radiation budget model and weather variables to identify at least one of wet, snow covered, or ice covered road surfaces; and outputting a road condition prediction for the road segment based on the road condition model.

9. The system of claim 8, wherein selecting the road segment comprises:

determining, from a weather data source, present weather conditions for a geographic area indicate ice is possible on roadways within the geographic area;

identifying one or more road segments of concern within the geographic area; and selecting the road segment from the one or more road segments of concern for road condition prediction.

10. The system of claim 8, wherein generating the solar radiation budget model for the road segment comprises:

determining a time period for analysis for the road segment;

determining a geographic position of the road segment; and calculating an expected solar radiation budget for the road segment based on a solar position during the time period for analysis, the geographic position of the road segment, and weather conditions associated with the road segment during the time period for analysis.

11. The system of claim 10, wherein updating the solar radiation budget model for the road segment using the permanent structures model comprises:

determining a permanent sky view factor for the road segment using LIDAR data points, and updating the expected solar radiation budget based on the permanent sky view factor the solar position during the time period for analysis and the weather conditions associated with the road segment during the time period for analysis.

12. The system of claim 11, wherein updating the solar radiation budget model for the road segment using the dynamic structures model comprises:

updating the expected solar radiation budget based on the updated vegetation model factor the solar position during the time period for analysis and the weather conditions associated with the road segment during the time period for analysis.

13. The system of claim 8, wherein generating the road condition model for the road segment using the updated solar radiation budget model and the weather variables comprises:

generating an expected ice accumulation for the road segment based on the weather variables;

simulating an expected ice reduction for the road segment based on the weather variables, one or more road treatment factors, and the updated solar radiation budget model; and determining from the expected ice accumulation and the expected ice reduction the road condition prediction.

14. The system of claim 13, wherein when the road condition prediction indicates that ice is present on the road segment, outputting the road condition prediction for the road segment comprises:

generating an ice travel advisory for the road segment; and providing the ice travel advisory to a public warning system.

15. A non-transitory computer program product, the computer program product comprising:

a computer-readable storage medium having computer-readable program code embodied therewith, the computer-readable program code executable by one or more computer processors to perform an operation, the operation comprising:

selecting a road segment for road condition prediction based on weather conditions;

generating a solar radiation budget model for the road segment;

determining a vegetation model factor for the road segment;

updating the vegetation model factor, in a dynamic structures model for the road segment, based on growth prediction the tree, wherein the growth prediction is based on biomass growth estimates for the tree and localized growth models for the tree based on long term climate conditions of the road segment;

updating the solar radiation budget model using a permanent structures model and the dynamic structures model, wherein the permanent structures model is based on static objects near the road segment and the dynamic structures model is based on vegetation near the road segment where the vegetation growth model is used to determine a location, height and size of the vegetation near the road to determine a level the road segment is shaded by the vegetation;

generating a road condition model for the road segment using the updated solar radiation budget model and weather variables to identify at least one of wet, snow covered, or ice covered road surfaces; and outputting a road condition prediction for the road segment based on the road condition model.

16. The computer program product of claim 15, wherein selecting the road segment comprises:

determining, from a weather data source, present weather conditions for a geographic area indicate ice is possible on roadways within the geographic area;

identifying one or more road segments of concern within the geographic area; and selecting the road segment from the one or more road segments of concern for road condition prediction.

17. The computer program product of claim 15, wherein generating the solar radiation budget model for the road segment comprises:

determining a time period for analysis for the road segment;

determining a geographic position of the road segment; and calculating an expected solar radiation budget for the road segment based on a solar position during the time period for analysis, the geographic position of the road segment, and weather conditions associated with the road segment during the time period for analysis.

18. The computer program product of claim 17, wherein updating the solar radiation budget model for the road segment using the permanent structures model comprises:

determining a permanent sky view factor for the road segment using LIDAR data points, and updating the expected solar radiation budget based on the permanent sky view factor the solar position during the time period for analysis and the weather conditions associated with the road segment during the time period for analysis.

19. The computer program product of claim 18, wherein updating the solar radiation budget model for the road segment using the dynamic structures model comprises:

updating the expected solar radiation budget based on the updated vegetation model factor the solar position during the time period for analysis and the weather conditions associated with the road segment during the time period for analysis.

20. The computer program product of claim 15, wherein generating the road condition model for the road segment using the updated solar radiation budget model and the weather variables comprises:

generating an expected ice accumulation for the road segment based on the weather variables;

simulating an expected ice reduction for the road segment based on the weather variables, one or more road treatment factors, and the updated solar radiation budget model; and determining from the expected ice accumulation and the expected ice reduction the road condition prediction; and wherein when the road condition prediction indicates that ice is present on the road segment, outputting the road condition prediction for the road segment comprises:

generating an ice travel advisory for the road segment; and providing the ice travel advisory to a public warning system.

* * * * *